(12) United States Patent
Ganti et al.

(10) Patent No.: US 12,083,876 B1
(45) Date of Patent: Sep. 10, 2024

(54) DRIVE SYSTEM WITH BALANCED LOADS

(71) Applicant: GM GLOBAL TECHNOLOGY OPERATIONS LLC, Detroit, MI (US)

(72) Inventors: Venu Gopal Ganti, Troy, MI (US); Hai Xu, Northville, MI (US); Hun J Kim, Novi, MI (US); Avinash Singh, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/315,817

(22) Filed: May 11, 2023

(51) Int. Cl.
| | |
|---|---|
| *F16H 1/08* | (2006.01) |
| *B60K 1/00* | (2006.01) |
| *B60K 17/16* | (2006.01) |
| *F16H 48/285* | (2012.01) |
| *F16H 57/04* | (2010.01) |

(52) U.S. Cl.
CPC .............. *B60K 1/00* (2013.01); *B60K 17/165* (2013.01); *F16H 48/285* (2013.01); *F16H 1/08* (2013.01); *F16H 57/041* (2013.01)

(58) Field of Classification Search
CPC ... B60K 1/00; B60K 2001/001; F16H 57/041; F16H 1/08; F16C 2223/00–2223/80
See application file for complete search history.

(56) References Cited

U.S. PATENT DOCUMENTS

| | | | | |
|---|---|---|---|---|
| 1,740,756 | A | * | 12/1929 | Weis ......................... F16H 1/22 74/410 |
| 1,928,684 | A | * | 10/1933 | Carlson .................. B60K 17/36 180/24.09 |
| 3,599,533 | A | * | 8/1971 | Anthony ................ B23D 37/00 409/284 |
| 8,015,900 | B2 | * | 9/2011 | Gmirya ..................... F16H 1/22 74/413 |
| 10,683,910 | B2 | * | 6/2020 | Matsumoto ............... F16H 1/08 |
| 11,054,001 | B1 | * | 7/2021 | Tamai ................... F16H 1/2827 |
| 11,156,250 | B2 | * | 10/2021 | Forster .................... F16C 33/60 |

FOREIGN PATENT DOCUMENTS

| | | | | | |
|---|---|---|---|---|---|
| CN | 203146755 | U | * | 8/2013 | |
| CN | 104633006 | A | * | 5/2015 | ............... F16H 1/08 |
| JP | 3618367 | B2 | * | 2/2005 | ............ B64C 27/14 |
| JP | 2007296636 | A | * | 11/2007 | |
| WO | WO-2011072601 | A1 | * | 6/2011 | ............... F16H 1/22 |

* cited by examiner

*Primary Examiner* — Sherry L Estremsky

(74) *Attorney, Agent, or Firm* — Lorenz & Kopf LLP

(57) ABSTRACT

A drive system includes a prime mover that provides an input, and an output system that is driven by the input. A torque transfer system is coupled between the prime mover and the output system. The torque transfer system includes two gear planes. Each of the gear planes includes a pair of gear meshes, and each of the pair of gear meshes has a floating structure.

20 Claims, 3 Drawing Sheets

DRIVE SYSTEM WITH BALANCED LOADS

INTRODUCTION

The present disclosure generally relates to drive systems and more specifically, to drive systems with a prime mover and a torque transfer architecture providing desired and optimized performance by using two planes of double helical gears with an axial floating mechanism to achieve balanced load sharing.

Drive systems of apparatus such as vehicles and other equipment and machinery, provide a motive force/torque for a variety of purposes. In applications such as a driveline of a vehicle, power from the prime mover is at a premium and is preferably conserved. When employing an electric prime mover such as a relatively high speed motor, any added loads on the motor shaft tend to increase power consumption leading to reduced operational range of the vehicle. In other various applications, added loads on the drive system may lead to a need to oversize the prime mover and/or to employ heavier bearings. Any added weight or size in battery powered vehicle applications may also lead to reduced range and so is preferably avoided.

In various applications, moving mechanical systems tend to have inefficiencies and losses that arise from sources such as friction and other generated forces or moments. As the desire to further reduce inefficiencies increases, such as in battery powered vehicle applications, additional improvements in drive system efficiency, such as by reducing losses, would be beneficial.

Accordingly, it is desirable to provide drive systems for a variety of applications that result in appropriate performance characteristics such as torque/force requirements, and that provide desired levels of efficiency at minimized complexity. Furthermore, other desirable features and characteristics of the present disclosure will become apparent from the subsequent detailed description and the appended claims, taken in conjunction with the accompanying drawings and the foregoing introduction.

SUMMARY

Systems are provided for delivering power through a drive system with desirable performance characteristics such as operating at high efficiency. In a number of embodiments, a drive system includes a prime mover that provides an input. The drive system includes an output system that is driven by the input. A torque transfer system is coupled between the prime mover and the output system. The torque transfer system includes two gear planes. Each of the gear planes includes a pair of gear meshes, and each of the pair of gear meshes has a floating structure.

In additional embodiments, each gear mesh includes one pair of gears that includes a right-hand helical gear and a left-hand helical gear and another pair of gears that includes another right-hand helical gear and another left-hand helical gear. Each of the right-hand helical gears meshes with one of the left-hand helical gears so that axial forces are cancelled.

In additional embodiments, the floating structure includes a surface treatment configured to minimize friction.

In additional embodiments, the prime mover is a motor with a motor shaft configured to float axially by a pair of cylindrical roller bearing assemblies that support the motor shaft.

In additional embodiments, the output system is a final drive assembly with a differential.

In additional embodiments, the two gear planes each include a pair of helical gears meshing with another pair of helical gears.

In additional embodiments, the two gear planes include four pairs of meshing helical gears. One pair of helical gears is carried by the prime mover, two other pairs of helical gears are carried by the torque transfer system, and an additional pair of helical gears is carried by the output system.

In additional embodiments, the prime mover is a motor with a motor shaft. The torque transfer system is a number of torque transfer elements including a transfer shaft. The output system is a final drive system of a vehicle with an output shaft that includes a pair of half shafts of an axle.

In additional embodiments, the floating structure is a spline connection with a coating to reduce friction.

In additional embodiments, the floating structure is a pair of cylindrical roller bearing assemblies.

In a number of other embodiments, a drive system includes a prime mover with a motor to provide an input. An output system includes a final drive system to be driven by the input. A torque transfer system is coupled between the prime mover and the output system. The torque transfer system including two gear planes. Each of the gear planes includes a pair of gear meshes. Each of the pair of gear meshes includes a free floating structure to cancel axial forces in each of the two gear planes.

In additional embodiments, each of the pair of gear meshes includes a pair of gears that includes a right-hand helical gear and a left-hand helical gear and includes another pair of gears that includes a right-hand helical gear and a left-hand helical gear. The first right-hand helical gears mesh with left-hand helical gears so that axial forces are cancelled.

In additional embodiments, the free floating structure includes a surface treatment to minimize friction in each of the two gear planes. The surface treatment may include a surface finish, a coating, a ball spline and/or a higher diameter such as through a stepped shaft or an adapter plate.

In additional embodiments, the motor has a rotor having a motor shaft that floats axially by being supported by a pair of cylindrical roller bearing assemblies that allow the motor shaft to move axially.

In additional embodiments, the output system is a final drive assembly with a differential coupled with a pair of axle half-shafts.

In additional embodiments, the two gear planes each include a pair of helical gears meshing with another pair of helical gears. Each of the two gear planes includes another pair of helical gears meshing with a further pair of helical gears. One pair of helical gears is disposed in the prime mover. Two other pairs of helical gears are disposed in the torque transfer system. Another pair of helical gears is disposed in the output system.

In additional embodiments, the two gear planes include four meshing pairs of helical gears. One first pair of helical gears is carried by the prime mover. Two other pairs of helical gears are carried by the torque transfer system. Another pair of helical gears is carried by the output system. The free floating structure includes a free floating structure to provide balance between two of the pairs of helical gears. The free floating structure includes another free floating structure to provide balance between the other two pairs of helical gears.

In additional embodiments, the motor includes a motor shaft. The torque transfer system includes a number of torque transfer elements including a transfer shaft. The output system is the final drive system of a vehicle with an output shaft that includes a pair of half shafts of an axle. The motor shaft and the transfer shaft are engaged by a pair of meshing helical gears. The transfer shaft and the output shaft are engaged through another pair of meshing helical gears.

In additional embodiments, the free floating structure includes a spline connection with a coating to reduce friction and includes a pair of cylindrical roller bearing assemblies.

In a number of additional embodiments, a vehicle with a drive system includes a prime mover with a motor to provide an input. An output system is a final drive system to be driven by the input. A torque transfer system is coupled between the prime mover and the output system. The torque transfer system including two gear planes, wherein each of the gear planes includes a pair of gear meshes. Each of the pair of gear meshes includes a free floating structure to cancel axial forces in each of the two gear planes.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, brief summary or the following detailed description.

Figure 1:
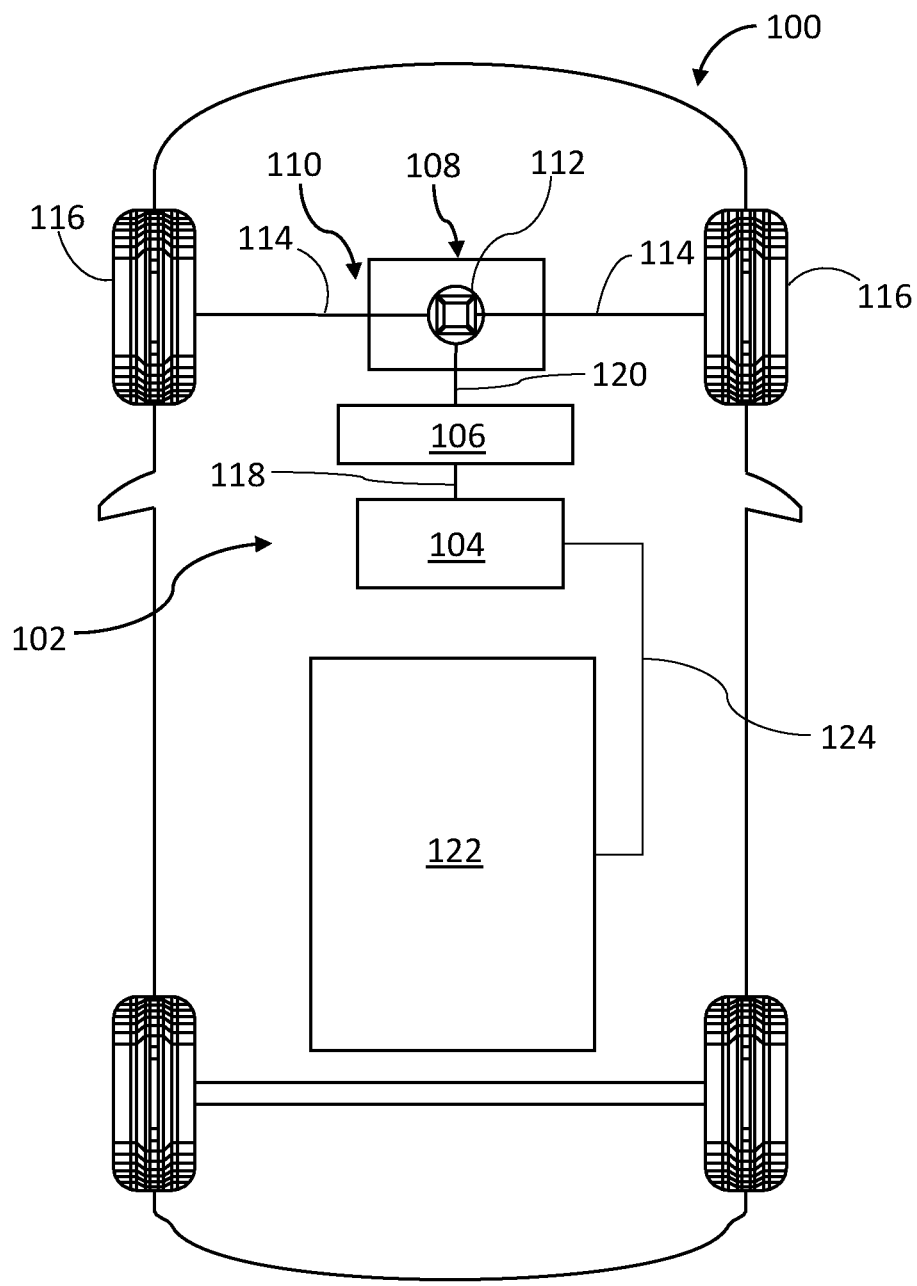
FIG. 1 is a schematic illustration of a vehicle with a drive system including a motor driven gear system, in accordance with various embodiments.

Referring to FIG. 1, an example application involves a vehicle 100 with a drive system 102. The drive system 102 includes a prime mover 104. As used herein, a prime mover 104 is an initial source of motive power such as a motor, an engine, or a combination thereof. In the current embodiment, the prime mover 104 is an electric motor, which may operate as a motor/generator in various applications. In other embodiments, the prime mover 104 may be an engine, such as an internal combustion engine, a hybrid system with an engine and a motor, or any of a variety of other powerplants. In the current embodiment, the drive system 102 generally includes the prime mover 104, a torque transfer system 106, and an output system 108.

The torque transfer system 106 may include any number of torque transfer elements to receive input from the prime mover 104 and transfer that input to the output system 108. A torque transfer element may be a gear, link, shaft, clutch, brake, chain, belt, plate, frame, or any physical structure that transfers torque from one object to another object, such as in transmitting power. In the current embodiment, the output system 108 is a final drive unit for an axle system 110 of the vehicle 100. In other embodiments, the output system 108 may be any system that uses the power supplied by the prime mover 104 as transferred through the torque transfer system 106. In the current embodiment, the output system 108 includes a differential 112 and a pair of half-shafts 114 driving a pair of wheels 116. The prime mover 104 is coupled with the torque transfer system 106 through an engagement link 118 that may be any combination of torque transfer elements. In addition, the torque transfer system 106 is coupled with the output system 108 through an engagement link 120 that may also be any combination of torque transfer elements. As a result, power from the prime mover 104 is supplied to the output system 108 and therethrough, to the wheels 116.

As an electric motor, in the current embodiment the prime mover 104 is coupled with a power supply 122 by a power conductor 124. The power supply 122 may include any combination of a controller, an energy storage system, power electronics, and other devices to operate the prime mover 104. Accordingly, the prime mover 104 drives the wheels 116 through the drive system 102 including the torque transfer system 106 and the output system 108. Although the current embodiment is disclosed in the context of a vehicle 100, other applications will benefit from the balancing/reduction of forces and the mechanisms disclosed herein. Accordingly, the current disclosure is not limited to any specific application, but instead may be applied wherever reduced loads on an input power source are desirable.

In the current embodiment, the vehicle 100 may be any type of vehicle. The prime mover 104 may be operated by any means and in the current embodiment is an electric motor and accordingly, the power supply 122 may be an electrical power supply including a battery system. As such, operation of the drive system 102 to propel the vehicle 100 may be limited by the storage capacity of power supply 122 leading to a limited electric operation range of the vehicle 100. Any reduction in power consumption is therefore beneficial in extending the range of the vehicle 100. The prime mover 104 may be configured to run at a variety of speeds including relatively high speeds which may compound any loads or losses introduced by any characteristics of, or inefficiencies in, the drive system 102. In certain embodiments, the prime mover 104 may spin at speeds that are many times the number of revolutions per minute of the element providing output from the drive system 102, and so any effects introduced into the motor may be amplified by the speed. In embodiments, any gearing ratio to provide the desired output speed that is appropriate for the application may be used.

The drive system 102 may be any of a variety of configurations of gears, shafts, and other elements. Mechanical excitation may occur during operation including from the mesh of the gears in the drive system 102 as a source. The excitation may lead to the transmission of forces and motions through the shafts and bearings and to other components of the vehicle 100, which may in turn radiate noise. Accordingly, in the current embodiment the gear system 26 may employ helical gears for a variety of benefits including noise avoidance. Helical gears may run more smoothly and quietly than other types of gears with less noise and vibration being generated. In some configurations, helical gears may lead to axial thrust loads and over-turning moments that may lead to losses in the drive system 102, particularly for shaft bearings of the prime mover 104, when configured as a motor. As described below, embodiments are provided herein where those losses are canceled.

Figure 2:
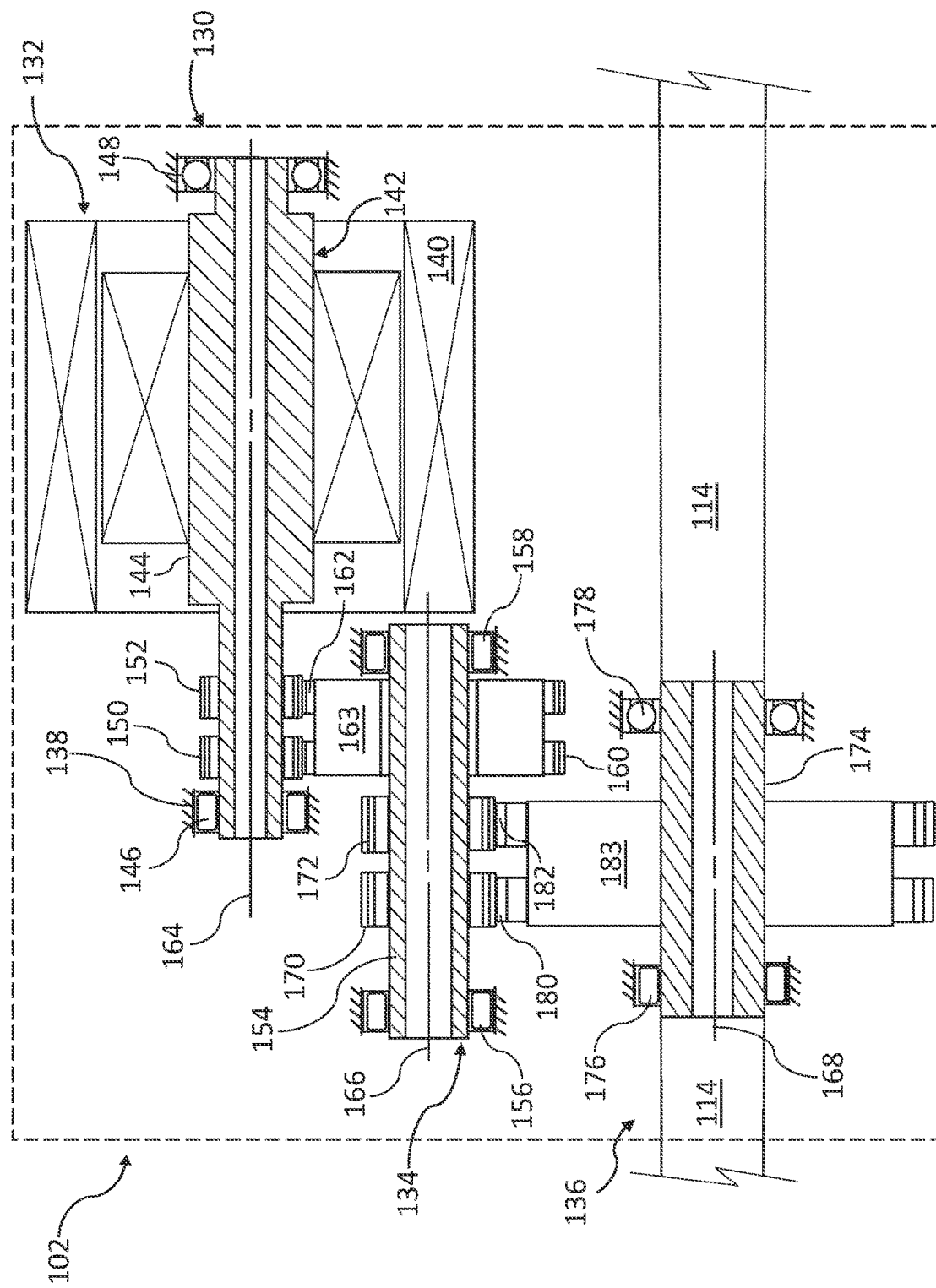
FIG. 2 is a schematic illustration of the drive system of the vehicle of FIG. 1, in accordance with various embodiments.

Referring additionally to FIG. 2 along with FIG. 1, the drive system 102 is shown schematically and is configured, at least in-part, as a drive unit 130. The drive unit 130 may be used for the vehicle 100 as an electric vehicle. In the drive unit 130, the prime mover 104 is configured as a motor 132, the torque transfer system 106 is configured as a transfer shaft assembly 134, and the output system 108 is configured as a final drive assembly 136. The drive unit 130 achieves the desired speed ratios between the motor 132 and the half-shafts 114 through two planes of gears (i.e., two stages of meshing gears). The first plane is between the motor 132 and the transfer shaft assembly 134 and the second plane is between the transfer shaft assembly 134 and the final drive assembly 136.

The motor 132 generally includes a stator 140 and a rotor 142. The rotor 142 includes a motor shaft 144 supported by at least two bearing assemblies, in this example bearing assemblies 146, 148. The motor shaft 144 includes and/or carries a pair of helical gears 150, 152. The helical gears 150, 152 may be configured as two separate structures between their teeth and the motor shaft 144 as shown or may be configured as two sets of teeth on one contiguous structure that is carried by the motor shaft 144.

The transfer shaft assembly 134 includes a transfer shaft 154 supported by at least two bearing assemblies, in this example bearing assemblies 156, 158. The transfer shaft 154 is disposed parallel to, and spaced from, the motor shaft 144. The transfer shaft 154 carries a pair of helical gears 160, 162. The helical gears 160, 162 may be configured as two separate structures between their teeth and the transfer shaft 154 or may be configured as two sets of teeth on one contiguous structure 163 as shown, that is carried by the transfer shaft 154. The helical gear 150 meshes with the helical gear 160 and the helical gear 152 meshes with the helical gear 162.

The teeth of the helical gears 150, 152, 160, 162 are cut at angles to the rotational axes 164, 166 respectively, and follow a spiral path. The angle at which the teeth are cut is referred to as the helix angle and may be either a right-hand helix or a left-hand helix. When employing helical gears 150, 160 on parallel axes 164, 166, in order for the helical gears 150, 160 to mesh together, helical gear 150 has a given handed helix and the meshing helical gear 160 has the opposite handed helix. On both of the meshing helical gears 150, 160 the helix angles will be of the same magnitude. Similarly, for the helical gears 152, 162 to mesh together, helical gear 152 has given handed helix and the meshing helical gear 162 has the opposite handed helix. Again, on both of the meshing helical gears 152, 162 the helix angles will be of the same magnitude.

The helical gears 150, 152 and the helical gears 160, 162 have a sliding contact of their meshing teeth. Friction may accompany this sliding action leading to the generation of loads such as forces directed in the axial direction along the axes 164, 166 that may result in drag on the drive system 102 and a side thrust (axial force) may arise from the helix angles along the axes 164, 166. To offset the axial forces from the mesh of helical gears 150, 160, the opposite handed helix of the helical gears 152, 162 generate forces in the opposite direction. In other words, if the helical gear 150 is right-handed, then the helical gear 152 is left handed, and if the helical gear 160 is left handed, then the helical gear 162 is right-handed. With a net-zero axial force due to the double helical gear arrangement between the motor shaft 144 and the transfer shaft 154, the generation of over-turning moments is also avoided.

The transfer shaft 154 also carries a second pair of helical gears 170, 172. The helical gears 170, 172 may be configured as two separate structures as shown between their teeth and the transfer shaft 154 or may be configured as two sets of teeth on one contiguous structure that is carried by the transfer shaft 154.

The final drive assembly 136 includes an output shaft 174 on an axis 168. The output shaft 174 is coupled with, or is embodied as, the half-shafts 114. The output shaft 174 is supported by at least two bearing assemblies, which in the current embodiment include bearing assemblies 176, 178. It will be appreciated that as a final drive of a vehicle axle, the output shaft 174 is configured to allow the half-shafts 114 to both drive the wheels 116 and to allow some level of relative rotation between the wheels 116, such as to maneuver the vehicle 100 around curves and corners. The final drive assembly 136 carries a pair of helical gears 180, 182, which are coupled, directly or indirectly such as through additional differential gearing, with the output shaft 174. The helical gears 180, 182 may be configured as two separate structures between their teeth and the output shaft 174 or may be configured as two sets of teeth on one contiguous structure 183 as shown, that is carried by, or engaged with, the output shaft 174.

With double helical gears in both stages including in the first plane between the motor 132 and the transfer shaft assembly 134 and in the second plane between the transfer shaft assembly 134 and the final drive assembly 136, efficiency of the drive unit 130 is maximized by eliminating over-turning moments and axial thrust forces that would otherwise be present in non-balanced systems. However, to further improve efficiency and minimize losses, an axial floating strategy and consequent enabling mechanisms are provided to achieve equal or balanced load sharing between the paired double helical gears.

Particularly, the two planes of double helical gears for a 3-axis (164, 166, 168) drive unit 130 may be provided with a pair of free floating structures to minimize losses. The pair of free floating structures may be configured in various combinations. Free floating in this disclosure means that the helical gear pairs may move axially to avoid axial and other forces that may otherwise arise due to gear variations such as due to manufacturing tolerances and imperfections.

Figure 3:
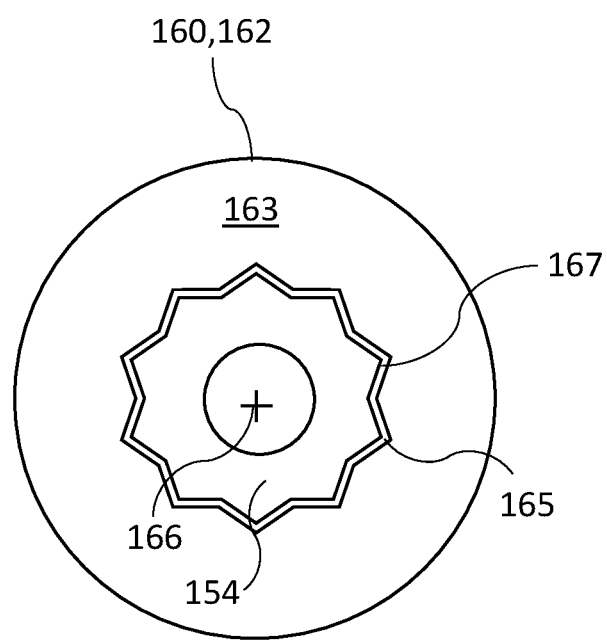
FIG. 3 is a schematic, sectional illustration of a free floating structure of the drive system of FIGS. 1 and 2, in accordance with various embodiments.

The two free floating structures may vary in specifics and may be supplied through a number of mechanisms that provide coupling interfaces that allow for torque transfer and that also allow relative axial motion between the participating members. In one example, a free floating structure may be a splined coupling with lower friction achieved through surface treatments, coatings, and special features such as a polytetrafluoroethylene coating to allow one element to freely slide axially relative to the other. The surface treatments may include providing a smooth or polished surface finish for low friction. For example, as shown in FIG. 3, the helical gears 160, 162 may be disposed on the transfer shaft 154 with a spline connection 165 that ensures the helical gears rotate about the axis 166 with the transfer shaft 154 and that allows the helical gears 160, 162 to slide relative to the transfer shaft 154 along the direction of the axis 166. In other embodiments, rather than the spline connection 165, a single keyway may be used. In the current embodiment, a surface treatment 167, such as a low friction coating or a surface finish, is provided in the spline connection 165 between the transfer shaft 154 and the contiguous structure 163. In other embodiments, another low friction mechanism such as a ball spline may be provided as the surface treatment 167 between the transfer shaft 154 and the contiguous structure 163. In additional embodiments, a low friction spline may be achieved by configuring the spline connection 165 on a higher diameter of a stepped segment of the transfer shaft 154 as the surface treatment 167. In still further embodiments, a low friction spline may be achieved by placing the spline connection 165 on a larger diameter through an adapter plate between transfer shaft 154 and the contiguous structure 163 of the helical gears 160, 162 as the surface treatment 167.

In a number of embodiments, the two free floating structures may include a float of the helical gears 160, 162 on the transfer shaft 154 and float of the transfer shaft 154 itself. Float of the helical gears 160, 162 may be provided through, for example, a splined connection or other mechanism as described above. Float of the transfer shaft 154 allows the helical gears 170, 172 to seek a balance relative to the helical gears 180, 182. The float of the transfer shaft 154 may be provided by configuring both of the bearing assemblies 156, 158 as cylindrical roller bearings. With cylindrical roller bearings, the relatively rotating elements may move axially relative to one another as opposed to ball bearings where axial movement is restricted. When ball bearing assemblies are included, at least one on a given shaft inhibits axial float of that shaft.

In a number of other embodiments, the two free floating structures may include a float of the helical gears 160, 162 on the transfer shaft 154 and a float of the helical gears 170, 172 on the transfer shaft 154. Float of the helical gears 160, 162 on the transfer shaft 154 allows them to seek a balance with the helical gears 150, 152 on the motor shaft 144. Float of the helical gears 170, 172 allows them to seek a balance with the helical gears 180, 182 on the output shaft 174. In each case, float of the helical gears 160, 162, 170, 172 may be provided through, for example, a splined connection or other mechanism as described above.

In a number of additional embodiments, the two free floating structures may include float of the motor shaft 144 itself and float of the helical gears 170, 172 on the transfer shaft 154. Float of the motor shaft 144 allows the helical gears 150, 152 to seek a balance relative to the helical gears 160, 162. The float of the motor shaft 144 may be provided by configuring both of the bearing assemblies 146, 148 as cylindrical roller bearings to allow the relatively rotating elements may move axially relative to one another. Float of the helical gears 170, 172 may be provided through, for example, a splined connection or other mechanism as described above.

In a number of further embodiments, the two free floating structures may include float of the motor shaft 144 itself and float of the transfer shaft 154 itself. The float of the motor shaft 144 may be provided by configuring both of the bearing assemblies 146, 148 as cylindrical roller bearings to allow the relatively rotating elements may move axially relative to one another. The float of the transfer shaft 154 may be provided by configuring both of the bearing assemblies 156, 158 as cylindrical roller bearings to allow the relatively rotating elements may move axially relative to one another. In still further embodiments, other configurations may be provided as long as float is possible in each of the two gear planes of the drive unit 130.

As a result of the embodiments disclosed herein, shaft and bearing losses are significantly reduced in a three-axis drive unit by means of cancelling axial thrust loads and resultant moments. With minimized axial thrust loads smaller sized bearings may be used and bearing loss may be further reduced. Dual helical gear arrangements with free float are provided at each of the two gear axes. The free floating dual helical arrangement allows cancelling axial forces and overturning moments, including in the presence of manufacturing gear variations. Equal load sharing is accomplished by providing axial float in both gear planes. In each gear plane between the prime mover and the final drive, at least one of the dual helical components that is in mesh is provided with axial float.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A drive system comprising:
    a prime mover configured to provide an input;
    an output system configured to be driven by the input; and
    a torque transfer system coupled between the prime mover and the output system, including at least two gear planes, wherein each of the gear planes includes a pair of gear meshes, each of the pair of gear meshes configured with a floating structure including at least one pair of gears configured to float axially on a shaft, wherein the floating structure comprises a spline connection with a coating configured to reduce friction.

2. The drive system of claim 1, wherein each of the pair of gear meshes comprises a first pair of gears that includes a first right-hand helical gear and a first left-hand helical gear and a second pair of gears that includes a second right-hand helical gear and a second left-hand helical gear, wherein the first right-hand helical gear meshes with the second left-hand helical gear and the first left-hand helical gear meshes with the second right-hand helical gear so that axial forces are cancelled.

3. The drive system of claim 1, comprising a transfer shaft, wherein:
    the prime mover includes a motor shaft;
    the output system includes an output shaft;
    the transfer shaft is configured to transfer torque between the motor shaft and the output shaft;
    the shaft is the transfer shaft;
    the at least one pair of gears comprises two sets of teeth on a contiguous structure; and
    the contiguous structure comprises the at least one pair of gears configured to float axially on the shaft.

4. The drive system of claim 1, wherein the prime mover comprises a motor with a motor shaft configured to float axially by a pair of cylindrical roller bearing assemblies that support the motor shaft.

5. The drive system of claim 1, wherein the output system comprises a final drive assembly with a differential.

6. The drive system of claim 1, wherein the at least two gear planes include a first pair of helical gears meshing with a second pair of helical gears and a third pair of helical gears meshing with a fourth pair of helical gears.

7. The drive system of claim 1, wherein the at least two gear planes include a first pair of helical gears meshing with a second pair of helical gears and a third pair of helical gears meshing with a fourth pair of helical gears, wherein the first pair of helical gears is carried by the prime mover, the second pair of helical gears and the third pair of helical gears are carried by the torque transfer system and the fourth pair of helical gears is carried by the output system.

8. The drive system of claim 1, wherein:
the prime mover comprises a motor with a motor shaft;
the torque transfer system comprises a number of torque transfer elements including a transfer shaft, wherein the shaft is the transfer shaft; and
the output system comprises a final drive system of a vehicle with an output shaft comprising a pair of half shafts of an axle.

9. The drive system of claim 1, wherein the coating comprises a low friction material.

10. The drive system of claim 1, wherein the floating structure comprises a pair of cylindrical roller bearing assemblies.

11. A drive system comprising:
a prime mover configured as a motor to provide an input;
an output system configured as a final drive system to be driven by the input; and
a torque transfer system coupled between the prime mover and the output system, the torque transfer system including two gear planes, wherein each of the gear planes includes a pair of gear meshes, each of the pair of gear meshes configured with a free floating structure to cancel axial forces in each of the two gear planes, the floating structure including a transfer shaft configured to float axially and a pair of gears configured to float axially on the transfer shaft,
wherein the free floating structure includes a surface treatment configured to minimize friction in each of the two gear planes including between the pair of gears and the transfer shaft, wherein the surface treatment comprises at least one of a surface finish, a coating, a ball spline, and a higher diameter.

12. The drive system of claim 11, wherein each of the pair of gear meshes comprises a first pair of gears that includes a first right-hand helical gear and a first left-hand helical gear and a second pair of gears that includes a second right-hand helical gear and a second left-hand helical gear, wherein the first right-hand helical gear meshes with the second left-hand helical gear and the first left-hand helical gear meshes with the second right-hand helical gear so that axial forces are cancelled.

13. The drive system of claim 11, wherein the pair of gears comprises two sets of teeth on a contiguous structure, wherein the surface treatment is between the contiguous structure and the transfer shaft.

14. The drive system of claim 11, wherein the motor has a rotor having a motor shaft configured to float axially by being supported by a pair of cylindrical roller bearing assemblies that allow the motor shaft to move axially.

15. The drive system of claim 11, wherein the output system comprises a final drive assembly with a differential coupled with a pair of axle half-shafts.

16. The drive system of claim 11, wherein the two gear planes include a first pair of helical gears meshing with a second pair of helical gears and a third pair of helical gears meshing with a fourth pair of helical gears, wherein the first pair of helical gears is disposed in the prime mover, the second and third pairs of helical gears are disposed in the torque transfer system and the fourth pair of helical gears is disposed in the output system.

17. The drive system of claim 11, wherein the two gear planes include a first pair of helical gears meshing with a second pair of helical gears and a third pair of helical gears meshing with a fourth pair of helical gears, wherein the first pair of helical gears is carried by the prime mover, the second pair of helical gears and the third pair of helical gears are carried by the torque transfer system and the fourth pair of helical gears is carried by the output system, wherein the free floating structure includes a first free floating structure to provide balance between the first pair of helical gears and the second pair of helical gears and includes a second free floating structure to provide balance between the third pair of helical gears and the fourth pair of helical gears.

18. The drive system of claim 11, wherein:
the motor includes a motor shaft;
the torque transfer system comprises a number of torque transfer elements including the transfer shaft;
the output system comprises the final drive system of a vehicle with an output shaft comprising a pair of half shafts of an axle;
the motor shaft and the transfer shaft are engaged by one of the pairs of gear meshes which comprise a first pair of meshing helical gears; and
the transfer shaft and the output shaft are engaged through another of the pairs of gear meshes which comprise a second pair of meshing helical gears.

19. The drive system of claim 11, wherein the free floating structure comprises a spline connection with the coating configured to reduce friction and a pair of cylindrical roller bearing assemblies.

20. A vehicle with a drive system, the vehicle comprising:
a prime mover configured as a motor to provide an input;
an output system configured as a final drive system to be driven by the input; and
a torque transfer system coupled between the prime mover and the output system, the torque transfer system including two gear planes, wherein each of the gear planes includes a pair of gear meshes, each of the pair of gear meshes configured with a free floating structure to cancel axial forces in each of the two gear planes, wherein the floating structure comprises a spline connection with a coating configured to reduce friction.

* * * * *